United States Statutory Invention Registration [19]

[11] Reg. Number: H137

Briggs et al. [43] Published: Oct. 7, 1986

[54] PROCESS FOR REDUCING BETA ACTIVITY IN URANIUM

[75] Inventors: Gifford G. Briggs; Takeo R. Kato, both of Cincinnatti; Edward Schonegg, Cleves, all of Ohio

[73] Assignee: The United States of America as represented by The United States Department of Energy, Washington, D.C.

[21] Appl. No.: 722,023

[22] Filed: Apr. 11, 1985

[51] Int. Cl.[4] ..... C22B 60/02

[52] U.S. Cl. ..... 75/84.1 A; 75/84.1 R

[58] Field of Search ..... 75/84.1 A, 84.1 R

[56] References Cited

U.S. PATENT DOCUMENTS

| | | | |
|---|---|---|---|
| 2,754,347 | 7/1956 | Wroughton et al. | 75/84.1 A X |
| 2,758,023 | 8/1956 | Bareis | 75/84.1 A |
| 2,766,110 | 10/1956 | Weister | 75/84.1 A |
| 2,840,464 | 6/1958 | Wiswall | 75/84.1 A |
| 2,918,366 | 12/1959 | Buyers et al. | 75/84.1 R |
| 3,000,726 | 9/1961 | Spedding et al. | 75/84.1 R |

OTHER PUBLICATIONS

Travesi, et al. "The Composition of the Solids in the Smoke Released in the Calciothermic Process for the Manufacture of Uranium", in *Proceedings of the Second United National International Conference on the Peaceful Uses of Atomic Energy, vol. 4,* United Nations Publication, Geneva, 1958, pp. 93–101.

*Primary Examiner*—Herbert B. Guynn
*Assistant Examiner*—Matthew A. Thexton
*Attorney, Agent, or Firm*—Katherine P. Lovingood; Stephen D. Hamel; Judson R. Hightower

[57] ABSTRACT

This invention is a method for lowering the beta radiation hazards associated with the casting of uranium. The method reduces the beta radiation emitted from the as-cast surfaces of uranium ingots. The method also reduces the amount of beta radiation emitters retained on the interiors of the crucibles that have been used to melt the uranium charges and which have undergone cleaning in a remote handling facility. The lowering of the radioactivity is done by scavenging the beta emitters from the molten uranium with a molten mixture containing the fluorides of magnesium and calcium. The method provides a means of collection and disposal of the beta emitters in a manner that reduces radiation exposure to operating personnel in the work area where the ingots are cast and processed.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR REDUCING BETA ACTIVITY IN URANIUM

BACKGROUND OF THE INVENTION

This invention relates to the reduction of beta activity in uranium, and more specifically to the reduction of beta emitters from depleted uranium derbies and ingots and from crucibles used in the uranium manufacturing process, and is a result of a contract with the United States Department of Energy.

In the manufacture of uranium a significant amount of radiation is emitted from the surface of newly cast uranium ingots as well as from the interiors of the graphite crucible in which the ingot charges are melted. This is a considerable problem because radiation levels in a casting area can be sufficiently severe to require frequent personnel rotation at work stations where tasks bring workers into proximity with the ingots and crucibles.

A phenomenon associated with the casting of uranium is that the surfaces of the ingots, after stripping from the molds, exhibit high radiation levels which are many times greater than that emitted from a cut face of the same ingot. This radiation contains alpha particle, beta particle, and gamma components, but it is the strong beta component that is of greatest concern. This beta radiation penetrates several feet of air and constitutes a skin dose hazard.

Another phenomenon is the near absence of radiation in derbies newly prepared using magnesiothermic reduction processes. This phenomenon was also noticed and investigated by Spanish workers several years ago in connection with a similar calciothermic reduction of $UF_4$ to uranium metal, Travesi, et al., *The Composition of Solids in the Smoke Released in the Calciothermic Process for the Manufacture of Uranium*, Vol. 4, Peaceful Uses of Atomic Energy, 1958 (pp. 93–100). Although newly prepared derbies exhibit little initial radiation, the hazardous beta radiation appears in the derbies in less than a month. The inventors of the subject invention are not aware of methods previously developed to improve safety conditions by reduction of harmful beta activity in the work areas associated with melting and casting ingots.

SUMMARY OF THE INVENTION

In view of the above-mentioned problem in uranium manufacturing, it is an object of this invention to provide a process that reduces beta activity in newly cast uranium ingots and the crucibles in which the ingot charges are melted.

It is another object of this invention to improve safety conditions in the uranium manufacturing process.

It is a further object to remove beta emitters from the uranium before it is poured into ingots.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the process of this invention comprises heating uranium containing beta emitters in the presence of a salt selected from the group magnesium fluoride ($MgF_2$), calcium fluoride ($CaF_2$) and mixtures of $MgF_2$ and $CaF_2$ to a temperature sufficient to melt all the solids; allowing the liquid salt phase (containing salts $MgF_2$, $CaF_2$ or a mixture of the salts) to separate from and move above the heavier liquid uranium phase; and removing the uranium phase from the salt phase that contains a substantial amount of the beta emitters initially present in the uranium, thus reducing the beta activity in the uranium.

Preferably a mixture of $CaF_2$ and $MgF_2$ should be used, the best being a mixture containing between sixteen (16) and seventy-five (75) weight percent of $CaF_2$. Separation of the phases is best done by removing the molten uranium from the bottom of the container since most of the beta emitters remain in the upper salt phase.

This method of lowering beta emissions provides a considerable improvement in working conditions in the area of melting and casting uranium. Employee exposure to harmful radiation is lessened significantly and administrative time required to rotate personnel at a location of high radiation is eased when radiation is lower making rotation less frequent. A specific advantage of the process, if $UF_4$ is reduced to U using magnesium, is the use of slag liner as a source of $MgF_2$. If the reduction is done with calcium, then the $CaF_2$ slag liner can be used. This is advantageous because slag liner is abundant.

DETAILED DESCRIPTION OF THE INVENTION

A first consideration is the nature of the radiation associated with the casting process.

A phenomenon associated with castings of uranium is that the surfaces of the ingots, after stripping from the molds, exhibit high radiation levels which are many times greater than that emitted from a cut face of the same ingot. This radiation contains alpha particle, beta particle, and gamma components, but is the strong beta component that is of greatest concern. This beta radiation penetrates several feet of air and constitutes a skin dose hazard. We now recognize that the radioactivity stems from the decay daughters of $U_{238}$ as outlined below:

$$U_{238} \rightarrow Th_{234} + \alpha, \text{ Half-life, } T_{\frac{1}{2}} = 4.68 \times 10^9 \text{ years}$$

$$Th_{234} \rightarrow Pa_{234} + \overline{\beta} \qquad T_{\frac{1}{2}} = 24.1 \text{ days}$$

$$Pa_{234} \rightarrow U_{234} + \overline{\beta} \qquad T_{\frac{1}{2}}\ (98.84\%) = 1.17 \text{ minutes}$$

$$U_{234} \rightarrow Th_{230} + \alpha \qquad T_{\frac{1}{2}} = 2.445 \times 10^5 \text{ years}$$

In this partial decay scheme, it is the decay of the $Pa_{234}$ that yields very energetic beta particles (electrons) of 2.28 MEV maximum energy.

A feature of the radiation problem encountered in the casting process is that the radioactive daughter product $Th_{234}$ largely separates from the bulk of the molten metal and becomes highly concentrated in a thin layer on the surface of the solidified ingot. It is this strong separation of the $Th_{234}$ out of uniform solution in the bulk of the metal that gives rise to the high beta field in the air surrounding the ingot. If the minute amount of Th234 had remained uniformly dissolved throughout the volume of the ingot, the radiation problem would not exist. In such a case the $Th_{234}$ decays to $Pa_{234}$ and this in turn ejects high energy beta particle electrons within the ingot, and the fast moving beta electrons will be stopped by a very thin thickness of the dense uranium. The rapid slowing down of the beta electrons will produce "braking" or bremsstrahlung x-rays which in turn will be largely absorbed before reaching the surface of the ingot.

The separated and concentrated $Th_{234}$ at the ingot surface constitutes what is called an "unsupported" daughter product activity. (It is "unsupported" because the ratio of daughter $Th_{234}$ to parent $U_{238}$ atoms in the thin surface layer is many times greater than that corresponding to secular equilibrium between parent and daughter). The specific activity of the surface radiation is greatest immediately after casting at the time that the ingot is stripped from the mold and sawed to remove the top crop. The surface radiation will diminish with time as controlled by the half-life decay time of 24.1 days for $Th_{234}$. Conversely, the cut faces of the ingot will be lowest in specific activity immediately after casting because the ratio of $Th_{234}$ to $U_{238}$ atoms within the metal is now less than that corresponding to secular equilibrium. The radiation from a cut face will rise with time in accordance with a 24.1 day half-life as Th234 grows back in to reach the concentration corresponding to secular equilibrium. In about five months the radiation from the ingot surface should die down until it equals that from the cut face.

Perhaps the most curious and least well understood feature of the radiation from the ingots is its variation over the ingot surface. Invariably, the highest readings ($\beta+\gamma$) are found at the flat bottoms of the cylindrical ingots where the metal solidifies most rapidly against the mold cup. The readings generally taper off from the bottom to top of the cylindrical surface although this variation may be quite irregular. Radiation readings from the tops of the uncropped ingots tend to be higher than those from the uppermost side surface, but are also quite variable.

Uranium purified by various methods may exhibit very little initial radioactivity. However, as time passes following purification, the concentrations of daughter products $Th_{234}$ and $Pa_{234}$ will increase. Secular equilibrium will be essentially reestablished for these two isotopes in about five months. The equilibrium will be reestablished as determined by the half-life decay time of the $Th_{234}$ which is 24.1 days. After six half-lives or about 4.7 months, the $Th_{234}$ (and $Pa_{234}$) will have "grown in" to closely approach secular equilibrium. At secular equilibrium, the number of $U_{238}$, $Th_{234}$, and $Pa_{234}$ atoms undergoing decay per unit time will have become equal. Since the half-lives of $Th_{234}$ and $Pa_{234}$ are very short compared to the half-life of $U_{238}$, the actual concentrations of the two daughter products in the uranium or uranium compound will be very small. The atomic ratios of the $U_{238}$, $Th_{234}$ and $Pa_{234}$ will be proportional to the ratios of their half-lives. For example, 1400 pounds of uranium (the weight of uranium in what is referred to as a Mark 31B ingot) should contain 9.2 micrograms of $Th_{234}$ and 310 micro-micrograms of $Pa_{234}$ at secular equilibrium. Because the half-life decay of the uranium isotope $U_{234}$ is very long, secular equilibrium between this isotope and $U_{238}$ will not be reestablished for several hundred thousand years. Depleted $UF_4$ that which has been in storage for several years will thus always contain highly radioactive $Th_{234}$ and $Pa_{234}$ in secular equilibrium, and these elements will be uniformly distributed throughout the $UF_4$ in solid solution.

The key to the development of successful methods of reducing the radiation associated with the casting process came with the realization that the troublesome daughter product $Th_{234}$ (and hence also the $Pa_{234}$) is largely removed temporarily from uranium metal during the bomb reduction process in which the $UF_4$ is reduced to metal by reaction with magnesium. This phenomenon was noticed and investigated by Spanish workers several years ago in connection with the similar calciothermic reduction of $UF_4$ to metal as previously mentioned. In the reduction process, a two-phase liquid-liquid system is produced in which the radioactive daughter products are largely transferred from the liquid uranium phase to the molten $MgF_2$ slag phase. The separation process is quite similar in effect to a single-stage liquid-liquid solvent extraction process. With the realization that $Th_{234}$ is temporarily reduced in amount by contacting the molten metal with a molten salt phase, this general scheme is applied to the casting process. Derbies prepared and stored for a few months before being consumed in casting contain the $Th_{234}$ grown back in. The same is true of the recycled solid scrap and briquetted chips which may be included in the total charges going into the cylindrical ingots. A relatively small addition of $MgF_2$ or a mixture of $MgF_2$ and $CaF_2$ to the melting charges in the crucibles is quite effective in scavenging the $Th_{234}$ from the molten metal into the molten salt phase, and a mixture of the two fluorides is more effective as a scavenging agent in the casting process than either $MgF_2$, or $CaF_2$ alone. The melting points of pure uranium, $MgF_2$, and $CaF_2$ are respectively 1133° C., 1263° C., and 1380° C. Thus, on heating a uranium metal charge with either of the pure fluorides, the fluoride phase will not melt until the uranium metal has been superheated to temperatures well above its melting point. The salt phase probably cannot act as a very efficient scavenging agent until it has melted. However, the binary system MgF2-$CaF_2$ contains a deep eutectic melting at about 940° C. The eutectic composition is at 52 wt. % $CaF_2$. Any mixture of the two fluorides lying between about 16 and 75 wt. % $CaF_2$ should begin to melt at 940° C. and be completely molten at the melting point of uranium metal.

Thought has been given to possible mechanisms to explain in greater detail (1) how $Th_{234}$ originally present as thorium metal atoms uniformly dissolved in essentially "clean" casting charges becomes largely extracted within a thin surface layer on cast ingots and (2) how a molten salt phase of $MgF_2$ - $CaF_2$ can act effectively to scavenge the $Th_{234}$ into the salt phase. A possible explanation of (1) is as follows: In vacuum casting there exist low but significant partial pressures of oxygen and nitrogen in the furnace atmosphere. In general, the hot uranium (solid or molten) will react with all gas molecules of $0_2$ and $N_2$ that strike the clean metal surface. As the molecules of air are removed from the furnace atmosphere by reaction with the metal, they will be replenished by back-streaming of air through the pumps since the furnace pressure must remain essentially constant at whatever low pressure the pumps are capable of producing. Neither nitrogen nor oxygen has appreciable solubility in uranium with the result that minute inclusions of solid oxynitride must nucleate and grow within the molten metal. Since thorium forms even more stable chemical bonds with oxygen and nitrogen than does uranium, it is to be expected that a large fraction of the $Th_{234}$ atoms will form such bonds and be incorporated into the inclusions of the uranium oxynitrides. As the inclusions nucleate and grow in size, they will develop a tendency to leave the metal phase. The inclusions are lower in density than molten uranium and will tend to liquate upwards to the surface of the melt under the influence of gravity. Probably more important are phase separating mechanisms brought about by interfacial tension forces. If the uranium melt does not strongly "wet" the inclusions, any inclusion that has reached the surface of the melt or which finds itself at the melt-crucible wall interface will tend to remain there and not re-enter the metal phase. In other words the inclusions which carry most of the $Th_{234}$ from the melt will form "skull" material floating on the molten metal or will be trapped at the crucible wall. If the casting charges consist of essentially "clean" metal containing very little slag $MgF_2$ on the derbies, the skull material should consist of only a relatively small amount of the solid uranium oxynitrides (and some uranium carbide). If the small volume of skull material has extracted almost all of the $Th_{234}$, the specific radioactivity (mr/gram or cc) of this material should be very high. Upon pouring, some amount of the skull material will enter the mold to be trapped as a thin layer between the metal and mold surface. The rest will remain on the walls of the crucible.

A total of four pounds of the fluorides containing 19 wt. % $CaF_2$ is added to 1400 pounds of uranium metal (derbies plus recycled scrap metal) in a Mark 31B charge. On heating the charge in the crucible, the salt mixture begins to melt first at 940° C. and is completely melted at a temperature somewhat below the melting point of the uranium. As the metal begins to melt, the molten fluorides float on top of the liquid metal. As the metal becomes molten under the vacuum conditions, it is agitated by bubbles of escaping hydrogen that is present in the uranium in minute amounts. This ebullition of the melt helps mix the molten metal and fluorides. As the solid inclusions of uranium oxynitrides form they are taken into the molten fluoride phase by processes involving increased surface tension wetting of the particles by the salt phase and also because the molten fluorides can dissolve the oxynitrides to some extent. The $Th_{234}$ at this point is largely contained within the salt phase. Moreover, because the molten salts add considerably to the total volume of skull material, the specific radioactivity (or concentration of the activity) in the skull material is lowered. At pour, some of the skull may enter the mold and be trapped at the surfaces of the freezing ingot, but the $Th_{234}$ is far less concentrated in a surface layer on the ingot. Also most of the molten salt skull material remains in the drained crucible. Very little may flow out into the mold because of its relatively low density and because it may be rendered quite viscous by its content of undissolved uranium oxynitride particles.

The addition of the fluorides results in less of the total radioactivity being retained on the interior crucible wall after burnout of the crucibles since the daughter product activity is now diluted in a larger bulk of skull material. Most of this material drops out of the inverted crucible during the burnout to leave less activity on the crucible walls. Thus a greater fraction of the total activity is removed and captured at a separate location where it no longer poses a radiation hazard to operating personnel. Less of the total activity reaches the station where the crucibles are further cleaned manually and, of course, even less remains in the crucibles at the charging station.

The separation of the daughter product $Th_{234}$ which occurs in the manufacture of uranium using magnesio- or calciothermic reduction almost certainly proceeds by a mechanism similar to that discussed above for the casting operation. It is believed that the essential key is that a small content of oxygen must be present as an "impurity" in the reduction process. It must be present in sufficient concentration to react with the $Th_{234}$ to form the very stable thorium-oxygen bonds. In the reduction process the oxygen content ultimately ends up as the minor phases MgO and $UO_2$ in the slag $MgF_2$. The derby interior metal contains very little of the oxygen in the form of oxygen in solution or inclusions of $UO_2$. In the reduction process the $Th_{234}$ forms $ThO_2$ which is absorbed into the inclusions of $UO_2$ that are formed simultaneously. The inclusion material is then taken into the $MgF_2$ slag phase as previously discussed.

EXAMPLE

The magnesium fluoride for the test consisted of the depleted liner material ($MgF_2$) taken from the production supply of milled product. For some tests, the slag liner was leached with nitric acid, washed and dried before use. This was done to remove most of the uranium which is present in the milled slag as either free metal or uranium oxides. In the test work no obvious benefits were detected by leaching the slag liner material. In two test castings, $MgF_2$ was added as coarser lumps produced by breaking up massive reduction slag with a hammer.

About 25 pounds of calcium fluoride from a supply of pure precipitated material was combined with a further quantity of 70 pounds of pure $CaF_2$ was prepared in the laboratory. The laboratory material was precipitated by slurrying technical-grade, bagged, calcium hydroxide in dilute (36%) HF. The precipitated $CaF_2$ was filtered, washed and tray-dried in ovens. The soft cake was pulverized and passed through a 25-mesh screen before use.

The general procedure followed throughout the test program of $MgF_2$-$CaF_2$ addition was to cast consecutive groups of three ingots, two of which contained the fluoride additions and one of which contained no fluorides. The three ingots thus all would be similar in charge makeup (number of derbies and same type of recycle scrap). The ingot cast without fluoride addition differed in no way from regular production ingots and was considered to be a "control".

Casting with the fluoride addition differed in only one detail. Roughing evacuation of the furnace was done slowly over a period of up to five minutes. This was done to make sure that the mixture of the powdery fluorides would not be partially blown out of the crucibles by the sudden expansion of air entrapped in the powders but later work showed that this precaution was not necessary.

The radiation measurements were made on the ingots within a day after casting and usually immediately after stripping from the graphite molds. The readings (mr/hr) are taken using two Ludlum Model Geiger-Muller survey meters. (Model 3 is used in the lower ranges and Model 5 is used for higher ranges).

During the test work, an effort was made to retain the same two crucibles for repeated use in casting those test ingots containing the added fluorides. Similarly the same crucible was repeatedly used for casting of the "control" ingots. After each use the crucibles (test and control), following burnout, were set out and measured for radioactivity on their interior surfaces.

Some of the results of the tests on 30" long ingots with 10" diameter for both "control" and fluoride added charges are shown in Tables I–IV.

Tables I and II are for similar charges (three derbies plus solid scrap) while Tables III and IV are for charges with three derbies, solid scrap and machine turnings (briquettes).

TABLE I

Control Ingots - No Fluorides Added
Charge = 3 Derbies + Solid Scrap
Readings ($\beta + \gamma$), mr/hr

| INGOT | BOTTOM SURFACE | DISTANCE FROM BOTTOM (Circular Surface) 3" | 12" | 20" | 27" | TOP SURFACE |
|---|---|---|---|---|---|---|
| 3762 | 1800 | 1400 | 1400 | 1300 | 650 | 400 |
| 3800 | 1850 | 1000 | 700 | 1400 | 900 | 125 |
| 3827 | 1800 | 1200 | 800 | 1000 | 70 | 600 |
| 3907 | 1800 | 1500 | 1500 | 1100 | 75 | 500 |
| 3940 | 1600 | 1350 | 1000 | 800 | 200 | 550 |
| 4165 | 1850 | 350 | 1150 | 1100 | 450 | 400 |
| 4207 | 1500 | 1200 | 1100 | 900 | 80 | 150 |
| 4238 | 900 | 600 | 120 | 400 | 60 | 600 |
| 4251 | 1300 | 1050 | 650 | — | — | 600 |
| 4321 | 1200 | 775 | 725 | 800 | 55 | 250 |
| Avg. | 1560 | 1043 | 915 | 978 | 282 | 418 |

TABLE II

Test Ingots - Fluorides Added
19 wt. % $CaF_2$/81 wt. % $MgF_2$ added
(4 lbs/1400 lb charge)
CHARGE = 3 Derbies + Solid Scrap
Readings ($\beta + \gamma$), mr/hr

| INGOT | BOTTOM SURFACE | DISTANCE FROM BOTTOM (Circular Surface) 3" | 12" | 20" | 27" | TOP SURFACE |
|---|---|---|---|---|---|---|
| 4208 | 1600 | 700 | 500 | 600 | 170 | 400 |
| 4209 | 1550 | 400 | 850 | 75 | 500 | 750 |
| 4252 | 1300 | 450 | 90 | 70 | 120 | 500 |
| 4253 | 1050 | 150 | 40 | 35 | 500 | 140 |
| 4319 | 1300 | 70 | 50 | 28 | 20 | 400 |
| 4320 | 1150 | 80 | 30 | 28 | 20 | 400 |
| 4344 | 700 | 500 | 200 | 110 | 80 | 50 |
| Avg. | 1236 | 336 | 251 | 135 | 201 | 377 |

TABLE III

Control Ingots - No Fluorides Added
CHARGE = 3 Derbies, Solid Scrap, Machining Chips
Readings ($\beta + \gamma$), mr/hr

| INGOT | BOTTOM SURFACE | DISTANCE FROM BOTTOM (Circular Surface) 3" | 12" | 20" | 27" | TOP SURFACE |
|---|---|---|---|---|---|---|
| 3468 | 1200 | 600 | 700 | — | 160 | 1300 |
| 3718 | 1700 | 1100 | 750 | 700 | 500 | 60 |
| 3728 | 1750 | 1150 | 800 | 700 | 500 | 1500 |
| 3741 | 1850 | 1400 | 1200 | 1000 | 150 | 200 |
| 4346 | 1200 | 800 | 900 | 700 | 120 | 800 |
| 4535 | 1000 | 600 | 350 | 300 | 150 | 15* |
| 4558 | 2000 | 950 | 750 | 350 | 125 | 250 |
| Avg. | 1529 | 943 | 779 | 625 | 244 | 685** |

*Cropped Face
**w/o Cropped Face

TABLE IV

Test Ingots - Fluorides Added
19 wt. % $CaF_2$/81 wt. % $MgF_2$ added
CHARGE = 3 Derbies, Solid Scrap, Machining Chips
Readings ($\beta + \gamma$), mr/hr

| INGOT | BOTTOM SURFACE | DISTANCE FROM BOTTOM (Circular Surface) 3" | 12" | 20" | 27" | TOP SURFACE |
|---|---|---|---|---|---|---|
| 4221 | 800 | 15 | 14 | 45 | 50 | 50 |
| 4222 | 750 | 75 | 50 | 130 | 400 | 50 |
| 4345 | 600 | 450 | 65 | 55 | 100 | 60 |
| 4533 | 1000 | 55 | 55 | 30 | 20 | 15* |
| 4534 | 850 | 40 | 42 | 30 | 20 | 15* |
| 4557 | 550 | 45 | 47 | 20 | 17 | 500 |
| 4624 | 400 | 100 | 50 | 65 | 25 | 500 |
| Avg. | 707 | 111 | 46 | 54 | 90 | 232** |

*Cropped Face
**w/o Cropped Face

Most of the radiation measurements were made with the ingot lying horizontally. Readings were taken at the top of the uncropped ingot, in most cases, at four positions along the exposed topside sides, and on the flat bottom. The readings are somewhat subjective and tend to be the values indicated by the maximum deflections of the meter needle.

Comparing the controls with the fluoride additives the following reductions in radiation were observed.

| CHARGE | BOTTOM SURFACE | DISTANCE FROM BOTTOM 3" | 12" | 20" | 27" | TOP SURFACE |
|---|---|---|---|---|---|---|
| 3D, SS | 1.3 | 3.1 | 3.6 | 7.2 | 1.4 | 1.1 |
| 3D, SS brix | 2.2 | 8.5 | 17 | 12 | 2.7 | 3 |

The highest levels of radiation from the Mark 31B ingots are found at the flat bottoms of the ingots where the metal solidifies against the mold cup. There is still no very cogent explanation of this phenomenon. The addition of the fluorides to the melts has not reduced the radiation from these ingot bottoms to a satisfactory degree. At one time it was thought that some of the daughter product activity gathered in the skull material was being spewed out of the crucible during the period of the vigorous metal "boil", and that some of this material was dropping down to the bottoms of the molds where it eventually became trapped against the mold cup by the rapidly freezing metal.

Table V shows the readings obtained on the inside top (2" down) and on the inside bottom of crucibles used in making fluoride additive melts (crucible S 8808 and S 8809). Similar readings were obtained on one crucible (S 8811) used in casting "control" charges.

The results show a reduction of 4.6× in radiation from the top of the crucible and a 1.13× reduction at the bottom of the crucible. The overall reduction is about 2.9×.

TABLE V

Radiation Measurements Performed on Crucibles Used for Melting of Mk 31B Charges
Radiation ($\beta + \gamma$) in mr/hr. (After Burnout and Cleaning)

| Crucibles Used with Fluoride Additions: S 8808 TOP | S 8808 BOTTOM | S 8809 TOP | S 8809 BOTTOM | Control S 8811 TOP | Control S 8811 BOTTOM |
|---|---|---|---|---|---|
| 150 | 600 | 70 | 90 | 800 | 190 |
| 140 | 400 | 130 | 170 | 900 | 600 |

TABLE V-continued

Radiation Measurements Performed on Crucibles Used for Melting of Mk 31B Charges
Radiation ($\beta + \gamma$) in mr/hr. (After Burnout and Cleaning)

| | Crucibles Used with Fluoride Additions | | | | | |
|---|---|---|---|---|---|---|
| | S 8808 | | S 8809 | | Control S 8811 | |
| | TOP | BOTTOM | TOP | BOTTOM | TOP | BOTTOM |
| | 300* | 700 | 200 | 450 | 700 | 500 |
| | 110 | 400 | 300 | 700 | 1000 | 800 |
| | 80 | 500 | 95 | 500 | 900 | 700 |
| | 250 | 850 | 150 | 550 | 900 | 650 |
| | 110 | 900 | 600* | 700 | 900 | 800 |
| | 95 | 400 | 150 | 500 | 1200 | 1000 |
| | 110 | 650 | 140 | 500 | 750 | 800 |
| | 140 | 600 | 300 | 800 | 900 | 800 |
| | 90 | 700 | 120 | 700 | 500 | 500 |
| | 150 | 700 | 90 | 500 | 600 | 500 |
| | 200 | 750 | 110 | 600 | 850 | 750 |
| | | | 150 | 500 | 800 | 650 |
| | | | 190 | 500 | 700 | 725 |
| | | | | | | 600 |
| | | | 150 | 700 | 650 | 1000 |
| | | | 150 | 700 | ? | ? |
| | | | 250 | 500 | 250 | 450 |
| | | | 250 | 500 | Crucible cracked | |
| Avg. | 148 | 627 | 189 | 537 | 782 | 660 |

*Note highest "top" radiation readings obtained with additions of 6 lb $MgF_2$ containing no $CaF_2$.

As can be seen by these results the beta activity in these cast ingots and crucibles is significantly reduced using the process described. This reduction provides employees involved in melting and casting ingots a much safer work environment and those skilled in the art will become aware of further applications of the process upon study of the claims and specifications.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A process for reducing beta activity in uranium comprising:

placing uranium containing beta emitters and a salt selected from the group $CaF_2$, $MgF_2$ and mixtures of $CaF_2$ and $MgF_2$ in a container suitable for holding said uranium and said salt in a molten state in a vacuum;

in a vacuum, heating said uranium and said salt to a temperature sufficient to melt said uranium and said salt;

in a vacuum, maintaining said temperature for a time sufficient for a uranium phase and a salt phase containing said beta emitters to separate; and separating said salt phase containing said beta emitters from said uranium phase yielding uranium having reduced beta activity.

2. The process of claim 1 wherein said salt is a mixture of $CaF_2$ and $MgF_2$ having a composition of from 16 to 75 weight percent $CaF_2$.

3. The process of claim 2 wherein said temperature sufficient to melt said mixture is about 1133° C.

4. The process of claim 2 wherein said salt mixture is intially present in the amount of about 0.29 pounds per 100 pounds of said uranium.

* * * * *